US010481026B2

(12) United States Patent
May et al.

(10) Patent No.: US 10,481,026 B2
(45) Date of Patent: Nov. 19, 2019

(54) PIEZORESISTIVE PRESSURE SENSOR PROVIDED WITH A CALIBRATION RESISTOR OF THE OFFSET

(71) Applicant: Kolektor Microtel S.P.A., Inzago (Milan) (IT)

(72) Inventors: Roberto May, Milan (IT); Erminio Maria Bersani, Arese (IT); Paolo Pietro Suvighi, Casorate Primo (IT)

(73) Assignee: Kolektor Microtel S.P.A., Inzago (Milan) (IT)

( * ) Notice: Subject to any disclaimer, the term of this patent is extended or adjusted under 35 U.S.C. 154(b) by 119 days.

(21) Appl. No.: 15/665,584

(22) Filed: Aug. 1, 2017

(65) Prior Publication Data

US 2018/0038753 A1 Feb. 8, 2018

(30) Foreign Application Priority Data

Aug. 3, 2016 (IT) .................. 102016000081649

(51) Int. Cl.
*G01L 9/00* (2006.01)
*G01L 27/00* (2006.01)

(52) U.S. Cl.
CPC .......... *G01L 9/0055* (2013.01); *G01L 27/002* (2013.01); *G01L 27/005* (2013.01)

(58) Field of Classification Search
CPC .... G01L 9/0055; G01L 27/002; G01L 27/005
USPC ......................................... 73/1.62
See application file for complete search history.

(56) References Cited

U.S. PATENT DOCUMENTS

| 5,309,136 A * | 5/1994 | Rezgui ................ G01L 1/2268 338/2 |
| 2003/0041670 A1* | 3/2003 | Hirota ..................... G01L 19/02 73/720 |
| 2005/0264281 A1* | 12/2005 | Ishizaki ................ B82Y 25/00 324/207.21 |
| 2015/0219514 A1* | 8/2015 | Novellani ........... G01L 19/0092 73/714 |

FOREIGN PATENT DOCUMENTS

CN 204177507 U * 2/2015

OTHER PUBLICATIONS ("Analysis of a closed Wheatstone bridge consisting of doped piezo resistors", Tobias et al. (Year: 2011).*

* cited by examiner

*Primary Examiner* — Nathaniel T Woodward
(74) *Attorney, Agent, or Firm* — Blank Rome LLP

(57) ABSTRACT

The piezoresistive pressure sensor (1) comprises a rigid flat support (2), a flat flexible membrane (3) having a flat external face (4) exposed to a pressure of a fluid and a flat internal face (5) delimiting in cooperation with a flat internal face (7) of the support (2) a chamber (9) accommodating the deformation of the membrane (3), an electrical measuring circuit comprising a resistive Wheatstone bridge (10) applied on the flat internal face (5) of the membrane (3) for detecting the deformation of the membrane (3), and at least an electrical resistor (Rc) for calibrating the value of the output signal when the fluid is at a reference pressure, the calibration resistor (Rc) being applied on the flat internal face (5) of the membrane (3).

7 Claims, 6 Drawing Sheets

PIEZORESISTIVE PRESSURE SENSOR PROVIDED WITH A CALIBRATION RESISTOR OF THE OFFSET

RELATED APPLICATIONS

This application claims priority to Italy Application No. 102016000081649, filed Aug. 3, 2016. The above-identified related application is incorporated by reference.

FIELD OF USE

The present invention relates to a flat piezoresistive pressure sensor.

BACKGROUND OF THE INVENTION

In various sectors, such as industry, medicine and motor vehicles, use is known of piezoresistive pressure sensors incorporated in a transducer for measuring a pressure of a fluid.

A flat piezoresistive pressure sensor generally comprises a rigid flat support made of a ceramic material, a flat flexible membrane made of a ceramic material having a flat external face exposed to a pressure of a fluid and a flat internal face delimiting, in cooperation with a flat internal face of the support, a chamber accommodating a deformation of the membrane, a resistive Wheatstone bridge applied on the flat internal face of the membrane for detecting the deformation thereof.

One of the critical parameters of a pressure sensor is the offset, which must fall within a precisely-specified acceptance range.

By offset is meant the output signal of the resistive bridge when the membrane is subjected to a reference pressure.

The offset is prevalently caused by the tolerance in the construction of the resistive bridge using the silk screen printing method.

To correct the offset and reduce as far as possible the value, the resistive bridge is provided with a calibration resistor applied on the external face of the support and connected to the rest of the resistive bridge by suitable through-holes through the thickness of the support wall, which through-holes are clad with electrically-conductive material.

The calibration resistor in particular is inserted on the support in parallel or in series with a branch of the bridge and is cut with the laser for the appropriate choice of the value.

Owing to the presence of the calibration resistor, the pressure sensor has a production process that is very complex and consequently expensive, especially for the carrying out of the electrical connection between the calibration resistor and the rest of the resistive bridge.

Moreover the calibrating of the pressure sensor is rather complicated as it requires a delicate choice of the point of the calibration resistor at which to carry out a precise and accurate laser cut.

Further, the need to calibrate the pressure sensor after assembly thereof means that the calibration resistor must remain in an accessible position and therefore also exposed to the risk of damage.

SUMMARY OF THE INVENTION

The technical task of the present invention is to eliminate the above-mentioned drawbacks of the prior art.

In the scope of this technical task, an aim of the invention is to provide a piezoresistive pressure sensor that can be manufactured in a simple and economical way.

Another object of the invention is to provide a piezoresistive pressure sensor that is easy to calibrate.

Another object of the invention is to provide a piezoresistive pressure sensor that is constructionally simple, mechanically resistant, precise and accurate in measuring and a deterioration of which is minimised throughout its working life.

The technical task, as well as the other aims, are attained by a piezoresistive pressure sensor comprising a rigid flat support, a flat flexible membrane having a flat external face exposed to a pressure of a fluid and a flat internal face delimiting in cooperation with a flat internal face of said support a chamber accommodating a deformation of said membrane, an electrical measuring circuit comprising a resistive Wheatstone bridge applied on the flat internal face of said membrane for detecting the deformation of said membrane, and at least an electrical resistor for calibrating the value of said output signal when said fluid is at a reference pressure, characterised in that said calibration resistor is applied on said flat internal face of said membrane.

Said support preferably has a first pair of through-holes passing through a wall thickness thereof, clad in electrically conductive material and electrically connected to two supply terminals of said resistive bridge, a second pair of through-holes afforded through its wall thickness, coated with electrically-conductive material and electrically connected to two measuring terminals of an output signal of said resistive bridge and on a flat external face thereof a conditioning electronic device of said output signal electrically connected via the second pair of holes to said measuring circuit.

Said calibration resistor is preferably positioned in series or in parallel with said supply terminals and with said measuring terminals.

Said electrical measuring circuit preferably comprises a bypass of said calibration resistor.

Said electrical measuring circuit and said calibration resistor are preferably coated by a dielectric passivation layer.

Said electrical measuring circuit and said calibration resistor are preferably screen-printed onto said flat internal face of said membrane.

Said calibration resistor is preferably formed by a series of compartments selectively excludable for discrete variation of the calibration resistance value supplied.

For the dividing of said calibration resistor a series of electrically conductive compartmentalisation tracks is preferably provided, which tracks transversally intersect said calibration resistor at a progressively growing distance from an end thereof and project transversally beyond said calibration resistor up to intersecting said bypass.

The present invention also relates to a calibrating method of the piezoresistive pressure sensor in which for the calibration one or more laser cuts of said bypass are made so as to exclude one or more compartments of said calibration resistor.

According to the invention, the calibration resistor is advantageously printed together with the rest of the resistive bridge.

Furthermore, because of the bypass, the calibration resistor may not be perceived by the resistive bridge in a case where the bypass is then not cut.

For the calibrating, once the screen printing process of the resistive bridge has been completed, the membrane passes on to the laser calibrating.

In this step, the laser uses probes to measure the imbalance of the resistive bridge and uses a dedicated program to cut, if necessary, the electrically conductive track which forms the bypass so as to add or remove one or more compartments to the calibration resistor.

The laser can cut the bypass at points located between the compartmenting tracks, and the number of cuts can vary from product to product so as to quantify the value of the resistance that can be added in series to both the branches of the resistive bridge.

The bypass can be cut starting from both ends thereof so as to vary the resistance in an uncorrelated way and independently calibrate the branches of the resistive bridge.

The calibration resistor, being on the membrane, then covered by the mechanical coupling glass and the support, is advantageously protected from external agents which might cause deterioration thereof and thus a modification of the initial value thereof, and makes the sensor sturdier; furthermore, by cutting the conductive tracks of the bypass and not the resistor, the resistor is made more stable against future deterioration.

The pressure sensor advantageously has a limited number of through-holes through the thickness of the support.

The circuit layout of the pressure sensor on the support is advantageously extremely simplified as only the strictly necessary components are inserted on the support.

The calibration resistor is advantageously no longer in an uncovered position on the support and consequently can be completely covered with the dielectric passivation layer.

The calibrating process advantageously gives rise to a discrete regulation of the calibrating values, as the laser cuts only at precise points, thus giving the resistance precise and discrete values.

On this matter, generally a precise calibrating of the offset is not necessary, but only needs to be set within a predetermined acceptance range.

These and other aspects will be clarified by the description that follows of an embodiment of the invention which is to be taken as being by way of non-limiting example.

BRIEF DESCRIPTION OF THE DRAWINGS

The description refers to the attached tables of drawings, in which.

DETAILED DESCRIPTION OF THE ILLUSTRATED EMBODIMENTS

Figure 1A:
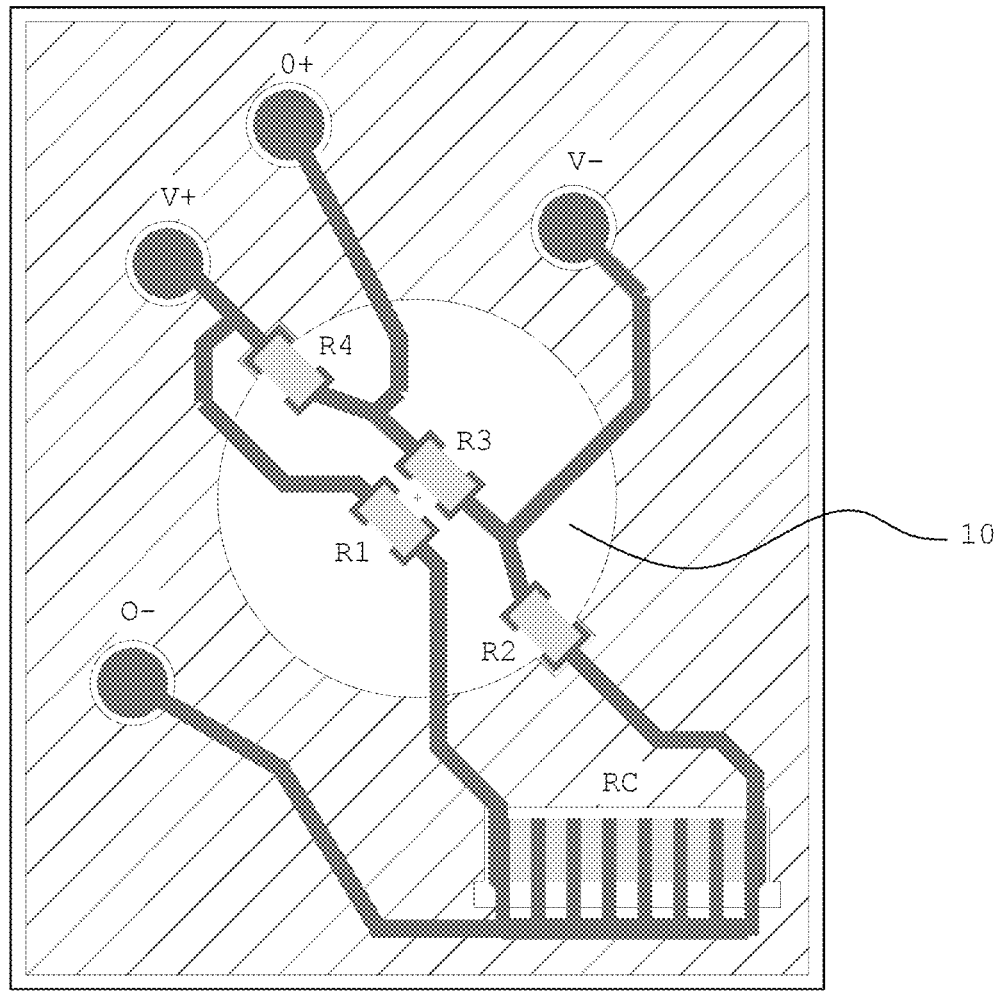
FIG. 1a illustrates an example of layout of the resistive bridge screen-printed on the flat internal face of the membrane, with the bypass not cut and thus excluding the calibration resistor.
Figure 1B:
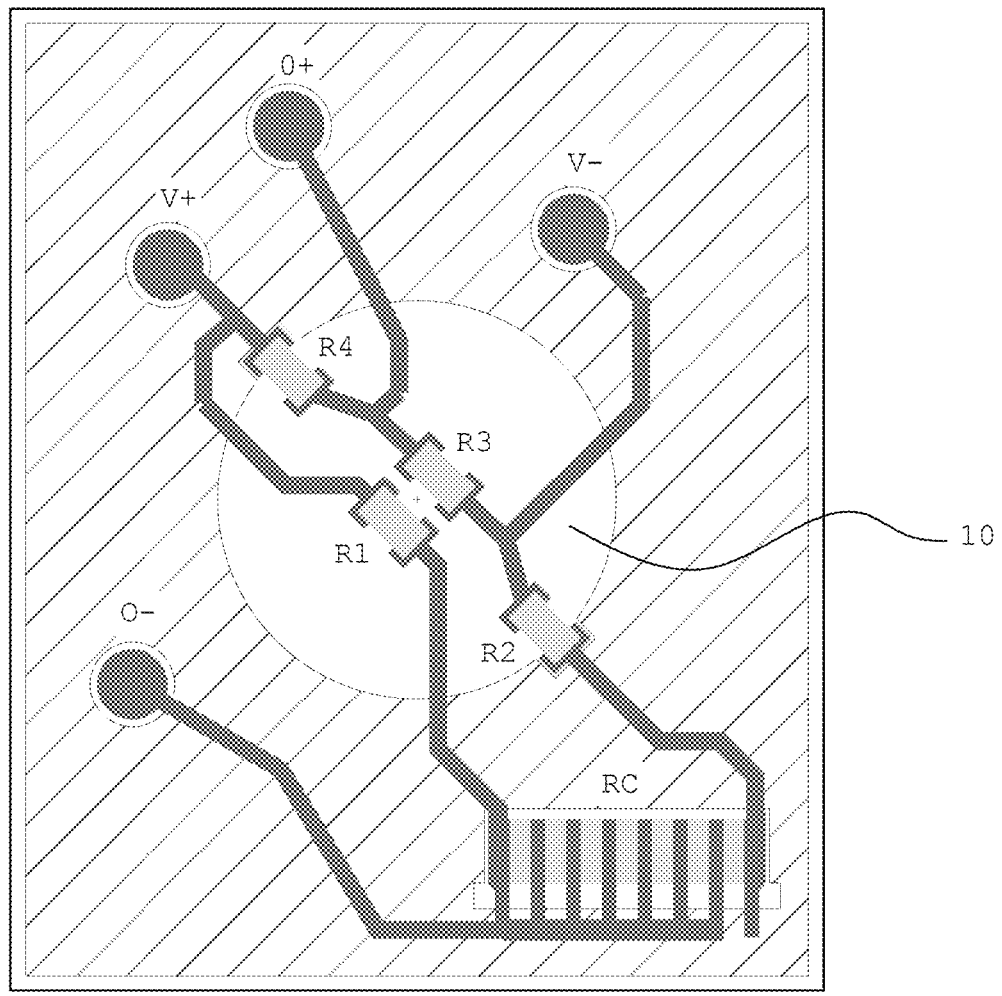
FIG. 1b shows the resistive bridge of FIG. 1a with one cut only of the bypass and therefore with six of the seven compartments of the calibration resistor excluded.
Figure 1C:
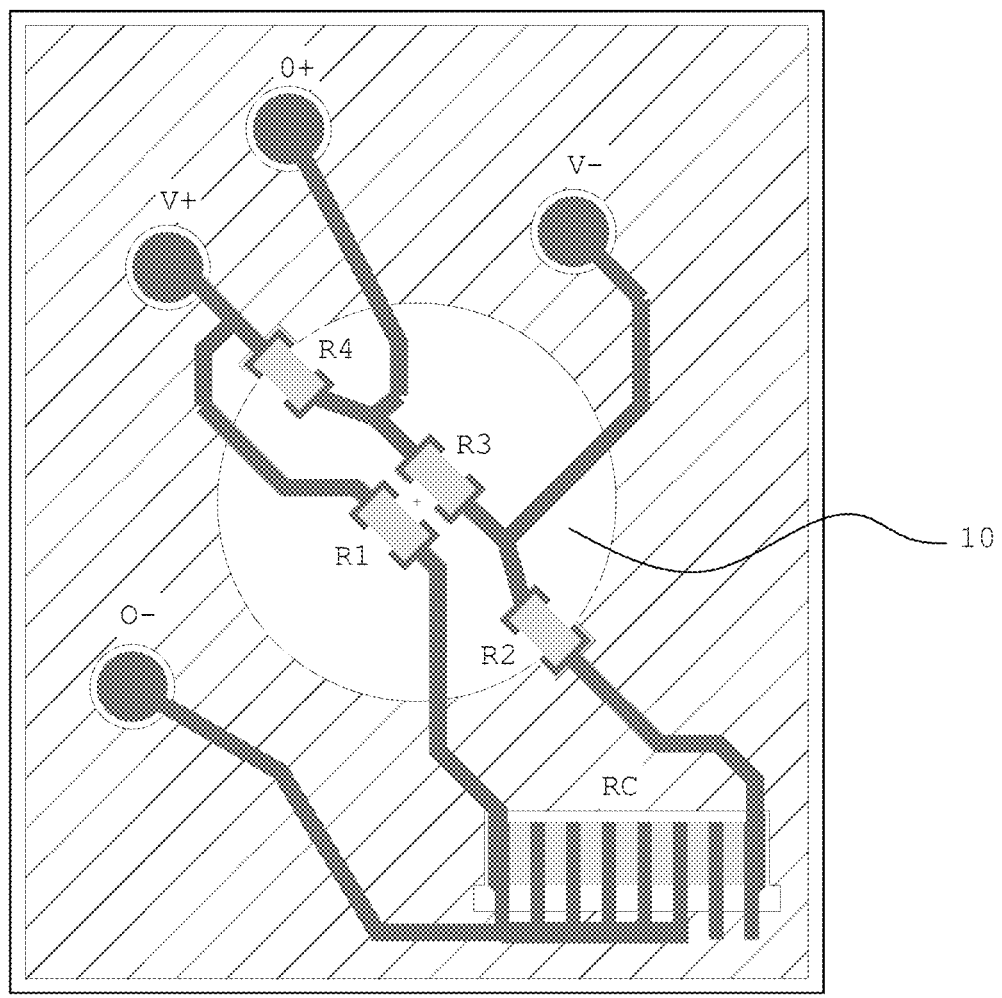
FIG. 1c shows the resistive bridge of FIG. 1a with two cuts of the bypass and therefore with five of the seven compartments of the calibration resistor excluded.
Figure 2A:
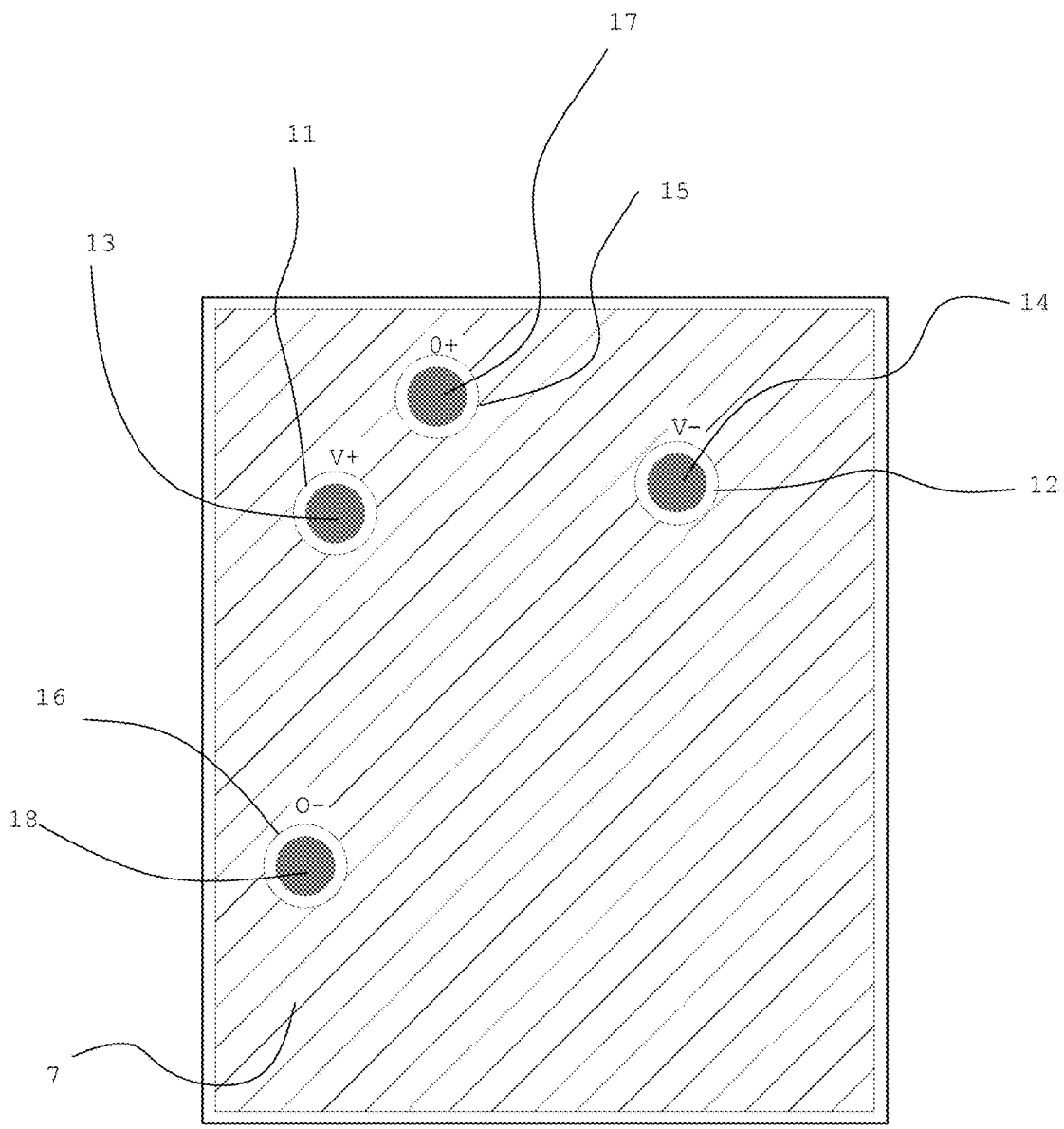
FIGS. 2a and 2b are plan views of the internal face of the support and of the membrane, before the coupling.
Figure 2B:
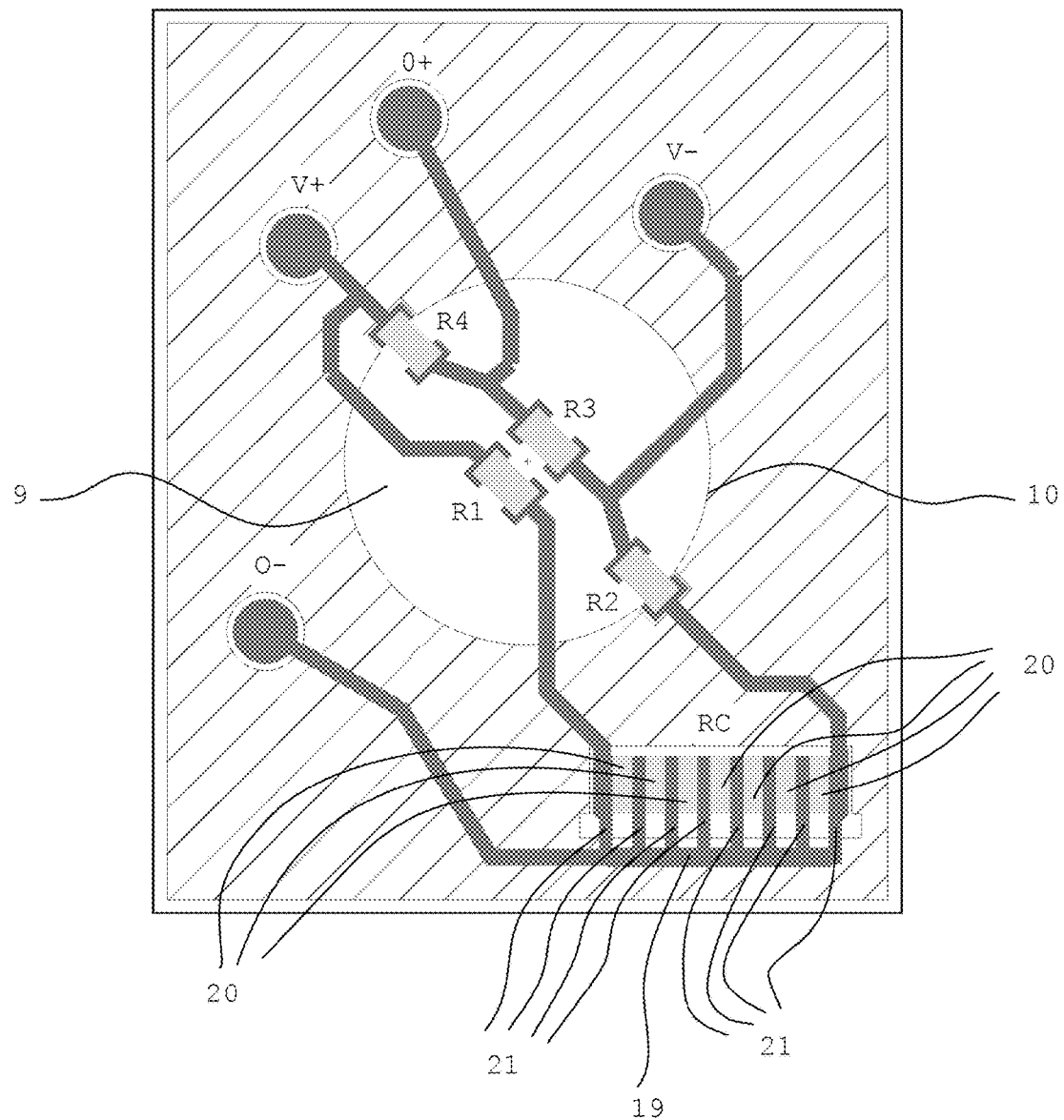
Figure 3A:
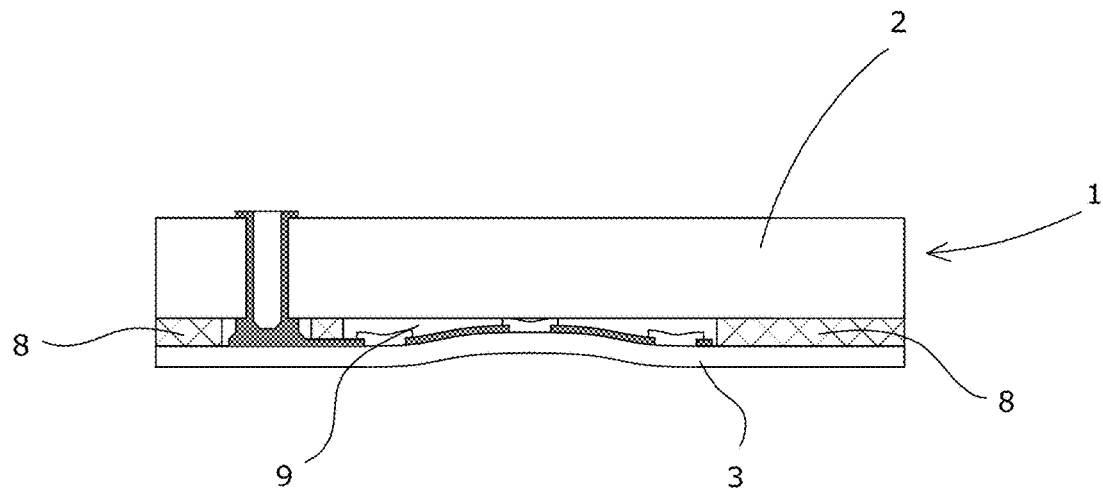
FIG. 3a is a lateral elevation view of the sectioned pressure sensor, with the membrane deformed by the fluid pressure.
Figure 3B:
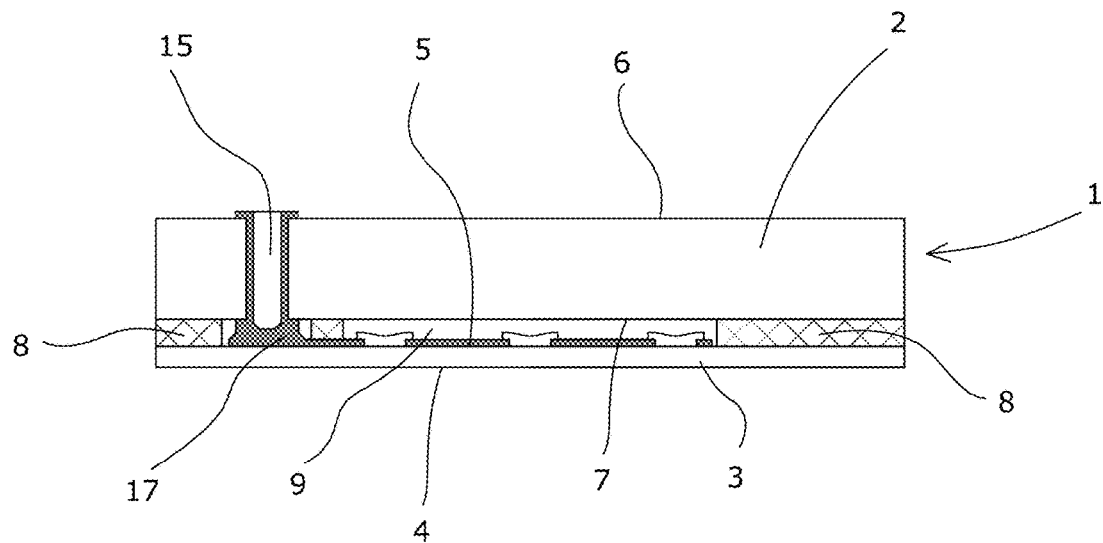
FIG. 3b is a lateral elevation view of the sectioned pressure sensor, with the membrane undeformed.

With reference to the appended figures, a piezoresistive pressure sensor is illustrated, generally indicated by numeral reference 1.

The pressure sensor 1 comprises a rigid flat support 2, formed in particular but not necessarily by a slab made of ceramic material having a circular, rectangular or even another shape, and a flat flexible membrane 3, formed in particular but not necessarily by a slab made of ceramic material that is thinner than the preceding slab and circular or even another shape.

The membrane 3 has a flat external face 4 exposed to the pressure to be measured of a fluid and a flat internal face 5.

The support 2 has an external face 6 and an internal face 7.

The internal face 7 of the support 2 and the internal face 5 of the membrane 3 are facing one another and, in cooperation with one another and with a glass layer 8 perimetrally interposed between them for reciprocal connection delimit a chamber 9 accommodating the deformation of the active part by action of the fluid pressure.

An electrical measuring circuit comprising a resistive Wheatstone bridge 10 is applied on the flat internal face 5 of the membrane 3 for detecting the deformation of the membrane 3.

The support 7 has a first pair of through-holes 11, 12 passing through a wall thickness thereof, clad in electrically conductive material 13, 14 and electrically connected to two supply terminals V+, V− of the resistive bridge 10, and a second pair of through-holes 15, 16 coated with electrically-conductive material 17, 18 and electrically connected to two measuring terminals 0+, 0− of an output signal of the resistive bridge 10.

The support 7 further has, on the flat external face 6 thereof a conditioning electronic device (not illustrated) of the output signal connected via a second pair of electrically conductive holes 15, 16 to the measuring circuit.

The Wheatstone resistive bridge 10 comprises four primary resistors R1, R2, R3 and R4.

The pressure sensor 1 further has an electrical resistor Rc for calibrating the value of the output signal when the fluid is at a reference pressure.

The calibration resistor Rc, electrically connected to the electrical measuring circuit, is advantageously applied on the flat internal face 5 of the membrane 3.

The calibration resistor Rc is in particular positioned in series at the supply terminals $V^+$ and $V^-$ and at the measuring terminals $0^+$ and 0.

The electrical measuring circuit preferably further comprises a bypass 19 of the calibration resistor Rc, formed in particular by an electrically conductive track.

The electrical measuring circuit and the calibration resistor Rc are applied by screen printing on the flat internal face 5 of the membrane 3 and are coated with a dielectric passivation layer (not illustrated).

The glass layer 8 delimits the chamber 9 and circumscribes both the resistances R1, R2, R3, R4 of the resistive bridge 10, which delimits the active area of the sensor, and the calibration resistance Rc which is thus completely protected.

The calibration resistor Rc is formed by a longitudinal element divided into a series of compartments 20 selectively excludable due to a discrete variation of the calibration resistance value supplied.

For the dividing of the calibration resistor Rc a series of electrically conductive compartmentalisation tracks 21 is provided, which tracks 21 transversally intersect the calibration resistor Rc at a progressively growing distance from an end thereof and project transversally beyond the calibration resistor Rc up to intersecting the bypass 19.

For the calibration, one or more laser cuts of the bypass 19 are made so as to exclude one or more compartments 20 of the calibration resistor Re.

For example, in the illustrated case, up to seven cuts of the bypass 19 can be carried out to modify the resistance value added in series to the branch of the bridge 10.

The manufacturing process of the pressure sensor takes place in the following way.

In a first passage a screening method is used to print an electrically conductive paste on the flat internal face of the support 2. The paste is aspirated so as to create the conductive deposits 11, 12, 15, 16 in the through-holes 13, 14, 17, 18 and a first firing is carried out.

Then the necessary electrically conductive tracks are printed on the flat external face of the support 2 and a second firing in the oven is carried out.

Then the fiducial markers are printed, with the traceability of the screening process with the protection dielectric.

At this point a part of the adhesive glass 8 is printed on the flat internal face of the support 2 which, with the remaining part of the adhesive glass 8 being printed on the flat internal face of the membrane 3, will serve to connect the support 2 of the membrane 3 and define the flexible area of the membrane 3.

Then the support 2 is sintered in the oven.

Thereafter, once more on the flat internal face of the support 2, and above the conductive paste printed in the first screening action, conductive glass is printed, and then a further sintering is carried out in the oven.

The support 2 is at this point ready for coupling.

On the flat internal face of the membrane 3, first the necessary conductive tracks are printed by the screening method and then, after a first firing in the oven, both the resistors R1, R2, R3, R4 of the bridge and the calibration resistor Rc are printed.

A further step of firing in the oven is then carried out.

At this point the calibration of the offset is carried out, possibly making one or more laser cuts of the bypass 19 so that the resistance provided by the calibration resistor Rc assumes an adequate value.

The measuring circuit and the calibration resistor are then coated with the passivation layer and the firing of the whole assembly is carried out.

The rest of the adhesive glass 8 is then printed on the flat internal face of the membrane 3 for gluing the support and the membrane 3 is newly placed in the oven to sinter the adhesive glass 8.

At this point, conductive glass is printed above the terminals for electrical connection to the conductive holes 11, 12, 15, 16, and a new sintering takes place in the oven.

At this point, the membrane is ready for coupling.

The coupling is done by superposing the flat internal faces of the support 2 and the membrane 3 so that the conductive glass zones superpose and the zones of the connecting glass superpose, and by sintering in the oven so that the adhesive glasses 8 fuse, becoming a single body, and the conductive glasses fuse to form the electrical connections.

At this point the conditioning electronics are mounted on the external face of the support 2. Obviously it is possible to contemporaneously produce a multitude of pressure sensors, by providing a large thick slab from which the supports 2 are fashioned and a large and thinner slab from which the membranes 3 are fashioned.

In practice the same operations as described in the foregoing are carried out contemporaneously on a series of prefixed zones of the thick slab and the thin slab, then the thick slab and the thin slab are joined to one another, and lastly the single pressure sensors are cut from the two joined slabs.

The pressure sensor as conceived herein is susceptible to numerous modifications and variants, all falling within the scope of the inventive concept; furthermore, all the details are replaceable by technically equivalent elements.

In practice the materials used, as well as the dimensions, can be any according to the needs and the state of the art.

The invention claimed is:

1. A piezoresistive pressure sensor (1) comprising:
   a rigid flat support (2) having a flat internal support face (7),
   a flat flexible membrane (3) having a flat external membrane face (4) exposed to a pressure of a fluid and a flat internal membrane face (5) delimiting, in cooperation with the flat internal support face (7), a chamber (9) accommodating a deformation of said flat flexible membrane (3),
   an electrical measuring circuit comprising a resistive Wheatstone bridge (10) applied on the flat internal membrane face (5) for detecting the deformation of said flat flexible membrane (3), and
   an electrical calibration resistor (Rc) for compensating an output signal value when said fluid is at a reference pressure,
   wherein:
   the calibration resistor (Rc) is applied on said flat internal membrane face (5);
   the electrical measuring circuit comprises a bypass (19) of the calibration resistor (Rc);
   the calibration resistor (Rc) is formed by a series of compartments (20) selectively excludable due to discrete variation of a calibration resistive value supplied;
   for calibration, the bypass (10) is configured to include one or more laser cuts to exclude one or more compartments (20) of said calibration resistor (Rc); and
   the one or more laser cuts of the bypass (10) occur at points between electrically conductive compartmentalization tracks (21), to exclude the one or more compartments (20), where a number of cuts are configured to vary, from sensor (1) to sensor (1), to individually quantify a value of a resistance added in series to each of both branches of the resistive Wheatstone bridge (10).

2. The piezoresistive pressure sensor (1) according to claim 1, wherein the support (2) has a first pair of through-holes (11, 12) passing through a wall thickness thereof, clad in electrically conductive material (13, 14) and electrically connected to two supply terminals ($V^+$, $V^-$) of said resistive bridge (10), a second pair of through-holes (15, 16) coated with electrically-conductive material (17, 18) and electrically connected to two measuring terminals ($0^+$, $0^-$) of an output signal of said resistive bridge (10) and on a flat external face (6) thereof a conditioning electronic device of said output signal electrically connected via a second pair of holes (15, 16) to said measuring circuit.

3. The piezoresistive pressure sensor (1) according to claim 2, wherein the calibration resistor (Rc) is positioned in series or in parallel with said supply terminals ($V^+$, $V^-$) and with said measuring terminals ($0^+$, $0^-$).

4. The piezoresistive pressure sensor (1) according to claim 1, wherein the electrical measuring circuit and said calibration resistor (Rc) are coated by a dielectric passivation layer.

5. The piezoresistive pressure sensor (1) according to claim 1, wherein the electrical measuring circuit and said calibration resistor (Rc) are screen-printed onto said flat internal membrane face (5).

6. The piezoresistive pressure sensor (1) according to claim 1, wherein, for sharing said calibration resistor (Rc), the electrically conductive compartmentalization tracks (21) are provided, where the tracks (21) transversally intersect said calibration resistor (Rc) at a progressively growing distance from an end thereof and project transversally beyond said calibration resistor (Rc) up to intersecting said bypass (19).

7. A calibrating method of the piezoresistive pressure sensor (1), according to claim 1, wherein calibration is carried out prior to a mechanical coupling between said support (2) and said membrane (3).

* * * * *